United States Patent
Kline et al.

(10) Patent No.: US 6,931,235 B2
(45) Date of Patent: Aug. 16, 2005

(54) METHOD AND APPARATUS FOR CO-CHANNEL INTERFERENCE MEASUREMENTS AND BASE STATION COLOR CODE DECODING FOR DRIVE TESTS IN TDMA, CELLULAR, AND PCS NETWORKS

(75) Inventors: Paul A. Kline, Gaithersburg, MD (US); Sergey L. Dickey, Fairfax, VA (US)

(73) Assignee: Dynamic Telecommunications, Inc., Germantown, MD (US)

( * ) Notice: Subject to any disclaimer, the term of this patent is extended or adjusted under 35 U.S.C. 154(b) by 882 days.

(21) Appl. No.: 09/795,225

(22) Filed: Feb. 28, 2001

(65) Prior Publication Data

US 2001/0034208 A1 Oct. 25, 2001

Related U.S. Application Data

(60) Provisional application No. 60/185,805, filed on Feb. 29, 2000.

(51) Int. Cl.[7] .................. H04B 17/00; H04B 15/00; H04B 1/00; H04B 1/10; H01Q 3/22
(52) U.S. Cl. .................. 455/67.11; 455/67.13; 455/63.1; 455/63.4; 455/297; 342/368
(58) Field of Search .................. 455/413, 414, 455/67.11, 67.13, 456.1, 456.3, 63.1, 63.4, 296, 297; 342/368, 357.06

(56) References Cited

U.S. PATENT DOCUMENTS

| | | | |
|---|---|---|---|
| 5,175,558 A | 12/1992 | DuPree | 342/378 |
| 6,130,643 A | 10/2000 | Trippett et al. | 342/380 |
| 6,141,371 A | 10/2000 | Holmes et al. | 375/130 |
| 6,169,896 B1 * | 1/2001 | Sant et al. | 455/424 |
| 6,192,244 B1 * | 2/2001 | Abbadessa | 455/436 |
| 6,442,393 B1 * | 8/2002 | Hogan | 455/456.5 |
| 6,522,888 B1 * | 2/2003 | Garceran et al. | 455/456.3 |
| 6,593,880 B2 * | 7/2003 | Velazquez et al. | 342/367 |
| 6,606,494 B1 * | 8/2003 | Arpee et al. | 455/421 |

* cited by examiner

Primary Examiner—Lee Nguyen
Assistant Examiner—Yuwen Pan
(74) Attorney, Agent, or Firm—Roberts Abokhair & Mardula LLC

(57) ABSTRACT

Co-channel interference in a wireless network is identified and quantified. Rather that using color code identification, a more reliable identification property of each co-channel component of the received composite signal is used, namely, the time of arrival of a known part of a signal. Detection and timing measurement is performed even in presence of stronger signals by focusing selectively on bursts having fixed contents (e.g., the FCCH burst used in GSM for frequency correction). The repetitive measurements of the time-of-arrival of each of the interfering components of the signal during a drive test enables determination of the geographical location of the interfering co-channel base stations.

9 Claims, 4 Drawing Sheets

METHOD AND APPARATUS FOR CO-CHANNEL INTERFERENCE MEASUREMENTS AND BASE STATION COLOR CODE DECODING FOR DRIVE TESTS IN TDMA, CELLULAR, AND PCS NETWORKS

CROSS REFERENCE TO RELATED APPLICATIONS

The present application claims priority under 35 U.S.C. § 119(e) from provisional application No. 60/185,805, filed Feb. 29, 2000. The 60/185,805 provisional application is incorporated by reference herein, in its entirety, for all purposes.

INTRODUCTION

The present invention relates generally to the field of Time Division Multiple Access (TDMA) Cellular and Personal Communications System (PCS) networks. More particularly, the present invention relates to a method and apparatus for identification and measurement of co-channel interference in TDMA and/or PCS networks during drive testing.

BACKGROUND OF THE INVENTION

It is well known that one of the major limitations in cellular and PCS wireless telephone networks is the so-called co-channel interference. In the case of TDMA networks, such as GSM or NADC (otherwise known as "IS-136"), the co-channel interference is mainly caused by the fact that the spectrum allocated to the system is reused multiple times ("frequency reuse"). The problem may be more severe, or less, depending on the reuse factor, but in all cases a signal, received by a handset, will contain not only the desired forward channel from the current cell, but also signals originating in more distant cells. If the interference from a distant cell causes a degradation of the ability of the handset to receive correctly the desired signal, it becomes important to identify the source of co-channel interference and measure the relative strength of interference relative to the desired signal.

The known art in the field of drive-test instrumentation systems attempt to solve the above problem by carrying out the decoding of the so-called "color code" contained in the signals of every cell in the system. An example of such system is the one from Agilent Technologies for the drive-test measurements of the GSM cellular networks. When used during a drive test on board of a moving vehicle, the test system determines the signal strength and color code (called in the case of GSM "base station identification code", or BSIC) for the desired signal, as well as the ratio of this signal's strength to the total strength of all co-channel interfering signals at regular frequent intervals on the vehicle path. In addition, at each measurement interval, it tries to decode the BSIC of one (dominating) co-channel interfering signal. The idea is that if all determinations were correct, they would provide the identification of interfering signals for the whole area covered by the drive test.

There are several reasons why the described method of co-channel interference measurement and identification has a severely limited utility.

One problem is that, since by definition the interfering co-channel signals are below the power level of the desired signal, the decoding of the color code of such signals is a difficult task. In absence of any processing gain associated with the decoding of the color code, the only approach available for this is some variation of the joint decoding of the desired signal and interfering signal or signals. There is a body of work describing such joint methods, but all share a common feature: to be useful, they have to be extremely complex in terms of the accuracy of the used channel models and exponential increase in the number of required operations versus the accuracy of the models and number of signals decoded. This common feature necessitates a truncation of the channel models in practical systems as well as limits in practice the number of jointly demodulated signals by two. Then there is no wonder that such systems have difficulty decoding color codes (BSIC in the case of GSM) in most cases, especially in presence of multipath and on board a moving vehicle. They work more reliably in a lab, although in a narrow range of relative power. The result is that the coverage of the interference information during a drive test is intermittent. The processing time of test instruments when they perform co-channel measurements and identification is fairly long and restricts the completeness of the coverage even further.

Another problem is that since color codes, including the BSIC in the GSM case, are not unique to base stations, but are repeated periodically, even when decoded, they provide limited identification capability in terms of establishing firmly which distant cell is the source of interference.

Furthermore, as was already mentioned, practical systems provide only information on one interfering co-channel signal. In practice, it is desirable to identify multiple interfering signals and measure their relative powers.

Thus, what is needed is a method and apparatus suitable for the measurement and unequivocal identification of several interfering co-channel signals with high reliability and completeness, and which would not require frequent use of processing-intensive and inefficient joint detection algorithms.

SUMMARY OF THE INVENTION

Co-channel interference in a wireless network is identified and quantified. Rather that using color code identification, a more reliable identification property of each co-channel component of the received composite signal is used, namely, the time of arrival of a known part of a signal. Detection and timing measurement is performed even in presence of stronger signals by focusing selectively on bursts having fixed contents (e.g., the FCCH burst used in GSM for frequency correction). The repetitive measurements of the time-of-arrival of each of the interfering components of the signal during a drive test enables determination of the geographical location of the interfering co-channel base stations.

It is an object of the present invention to provide the method and apparatus suitable for the measurement and unequivocal identification of several interfering co-channel signals with high reliability and completeness, and which would not require frequent use of processing-intensive and inefficient joint detection algorithms.

It is another object of the present invention to provide geographical locations of the identified sources of co-channel interference.

It is still another object of the present invention to provide a complete coverage of color-code information of the identified co-channel interfering signals without the need to carry out complex joint decoding of interference at every measurement point.

The present invention achieves the above objects by substituting for the color code a more reliable identification property of each co-channel "component" of the composite signal, namely, the time of arrival of a known part of a signal. As an example, in the GSM signal, one of the TDMA bursts has fixed contents and normally is used for frequency correction ("FCCH" burst). Since it consists of a long piece of a fixed signal (147-bit-long piece of a sine wave of fixed frequency), its detection provides a processing gain of more than 20 dB, and therefore the detection and timing measurement can be performed even in presence of stronger signals.

The repetitive measurements of the time-of-arrival of each of the interfering components of the signal allow the achievement of the second object of the invention—determination of the geographical location of the interfering base stations.

Finally, the third object can be achieved if the test instrument according to the present invention is able to keep track of each of the identified co-channel component during the course of the drive test for the duration of its existence, and is able to decode the color code content of each component at least once. When detected, the found color code information then can be back-annotated in the device data base, which already contains all the determinations of the component, albeit with no accompanying color code up to this point. In this manner, as already explained, one has to positively detect the color code only once in the life of the component during the drive test. That limits the number of time-consuming detections and allows to perform them at the points in space and time where the conditions are the most appropriate for such determinations, as, for example, when the test vehicle is the nearest to the base station that sends the component, or where the dominating signal is temporarily shaded by an obstacle. In principle, the test instrument according to the present invention may use one or several of methods for color code detection, including single-signal detection, joint detection, assisted or not by the use of a phase-array antenna for suppression of undesired components during detection.

Additional objects and advantages of the present invention will be apparent in the following detailed description read in conjunction with the accompanying drawing figures.

DETAILED DESCRIPTION OF THE INVENTION

Co-channel interference in a wireless network is identified and quantified. Rather that using color code identification, a more reliable identification property of each co-channel component of the received composite signal is used, namely, the time of arrival of a known part of a signal. Detection and timing measurement is performed even in presence of stronger signals by focusing selectively on bursts having fixed contents (e.g., the FCCH burst used in GSM for frequency correction).

The repetitive measurements of the time-of-arrival of each of the interfering components of the signal during a drive test enables determination of the geographical location of the interfering co-channel base stations. An algorithm according to an embodiment of the present invention is described as follows.

Figure 1:
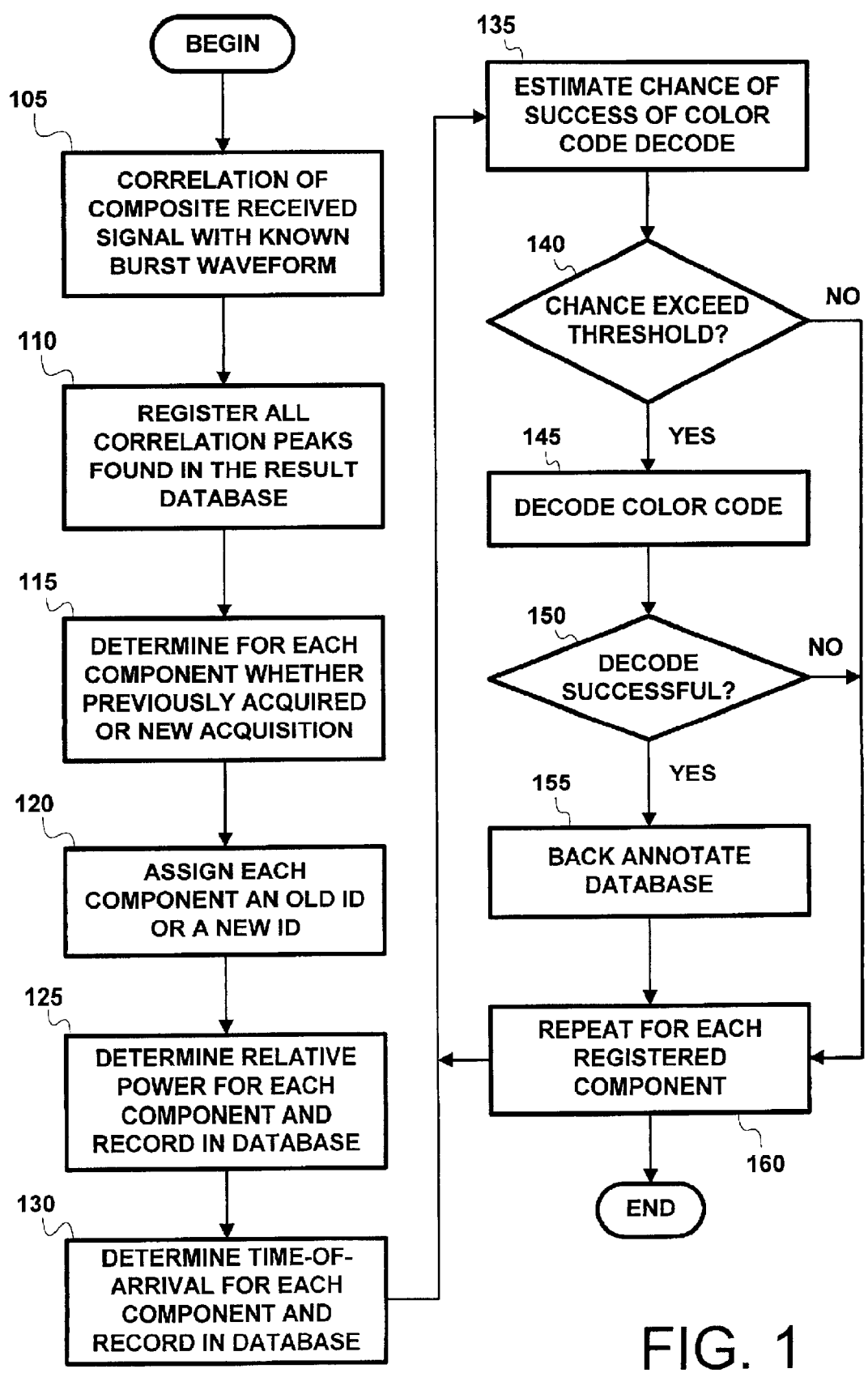
FIG. 1 illustrates a flowchart for a method according to an embodiment of the present invention.

Referring to FIG. 1, at each measurement point during the course of a drive test, correlate the received composite signal with the a priori known burst waveform 105, such as FCCH burst in GSM. Register all found correlation peaks 110 (called hereby "components") in the result database. Determine for each component if it is a new instance of a component already acquired during previous measurements, or a new one 115. Assign to each of the components logged at this point in the database either an old ID, same as for the previous instances of the same components, or a new one for a new component 120.

Next, for each component determine its relative power by the height of the correlation peak 125 and its time-of-arrival referenced to the internal time-base generator in the device 130. The data is logged into the database 125, 130 and use them for the display and further processing.

Figure 2:
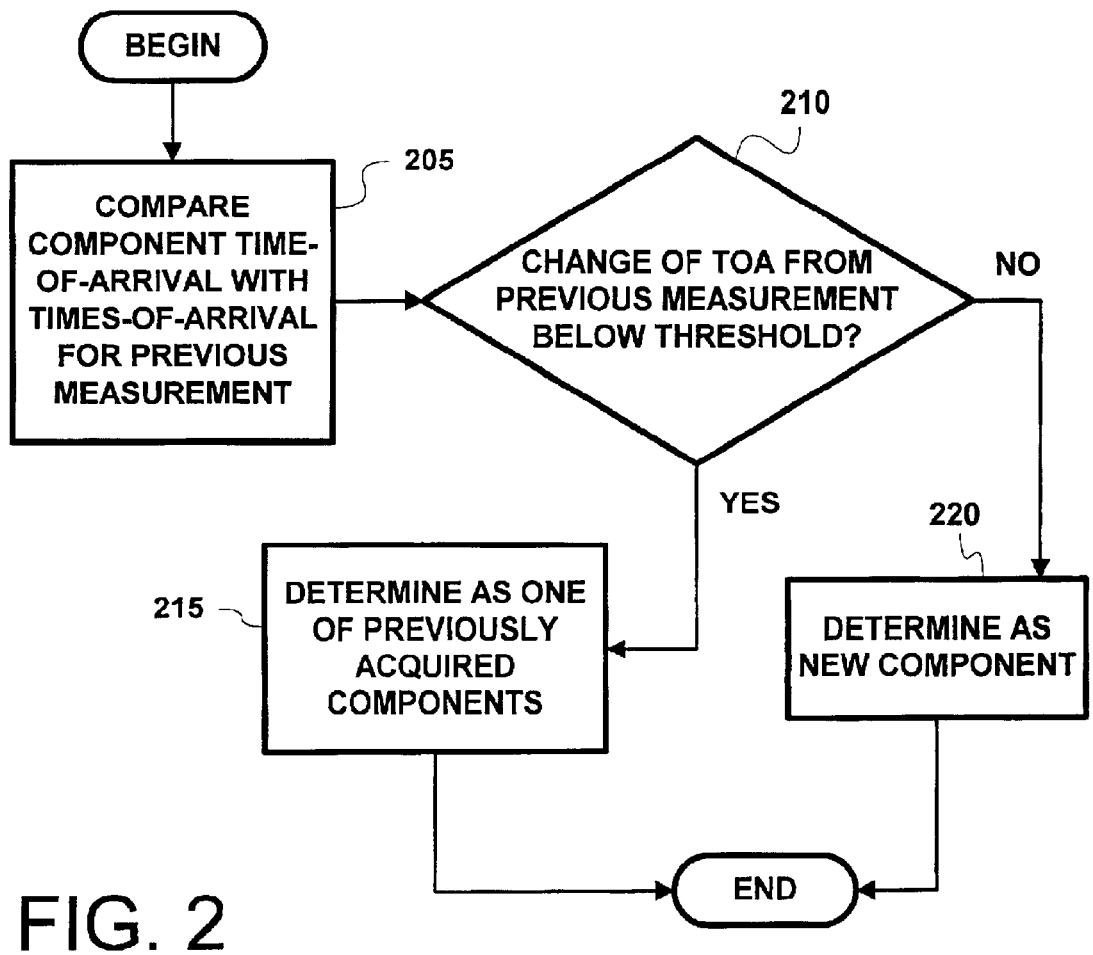
FIG. 2 illustrates a flowchart for implementing a step of the method of FIG. 1, according to an alternate embodiment of the present invention.

Two alternate or complementary methods of tracking components and establishing their belonging to the same source, or different sources, are proposed hereby. Referring to FIG. 2, an alternate embodiment method verifies the identity of the components 215, 220 by the rapidity, or abruptness, with which timing of components is changing from measurement to measurement 205, 210 during driving. A more reliable and beneficial method is described in the next paragraph.

Figure 3:
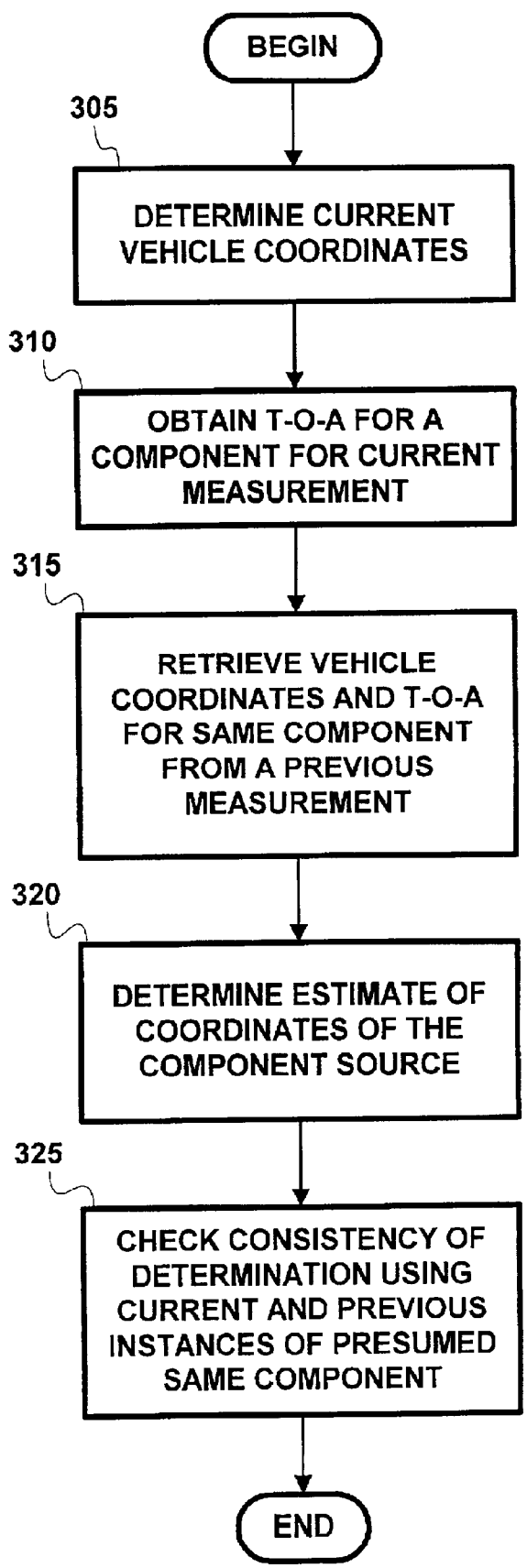
FIG. 3 illustrates a flowchart for implementing a step of the method of FIG. 1, according to a preferred embodiment of the present invention.

Referring to FIG. 3, according to a preferred embodiment of the present invention, the device includes a GPS receiver 420 that provides the co-ordinates of the test vehicle at each measurement point 305, a determination of the estimate of the geographical position of the component source 320 based on obtaining two difference-of-time-of-arrival (DTOA) data points 310, 315 during the course of the drive test and during the life time of a given component. The algorithm for such location is well known in the field of navigation. It has not been, however, applied for establishing the identity of co-channel components in a drive-test measurement system. According to the present invention, the identity of a component is being established by checking the consistency of the solution of the navigational problem using the current and earlier instances of an assumed component 325. A side benefit of this step of the algorithm is the availability of the geographical positions of component source as attributes of components in addition to the information on the relative power of each identified component.

Figure 4:
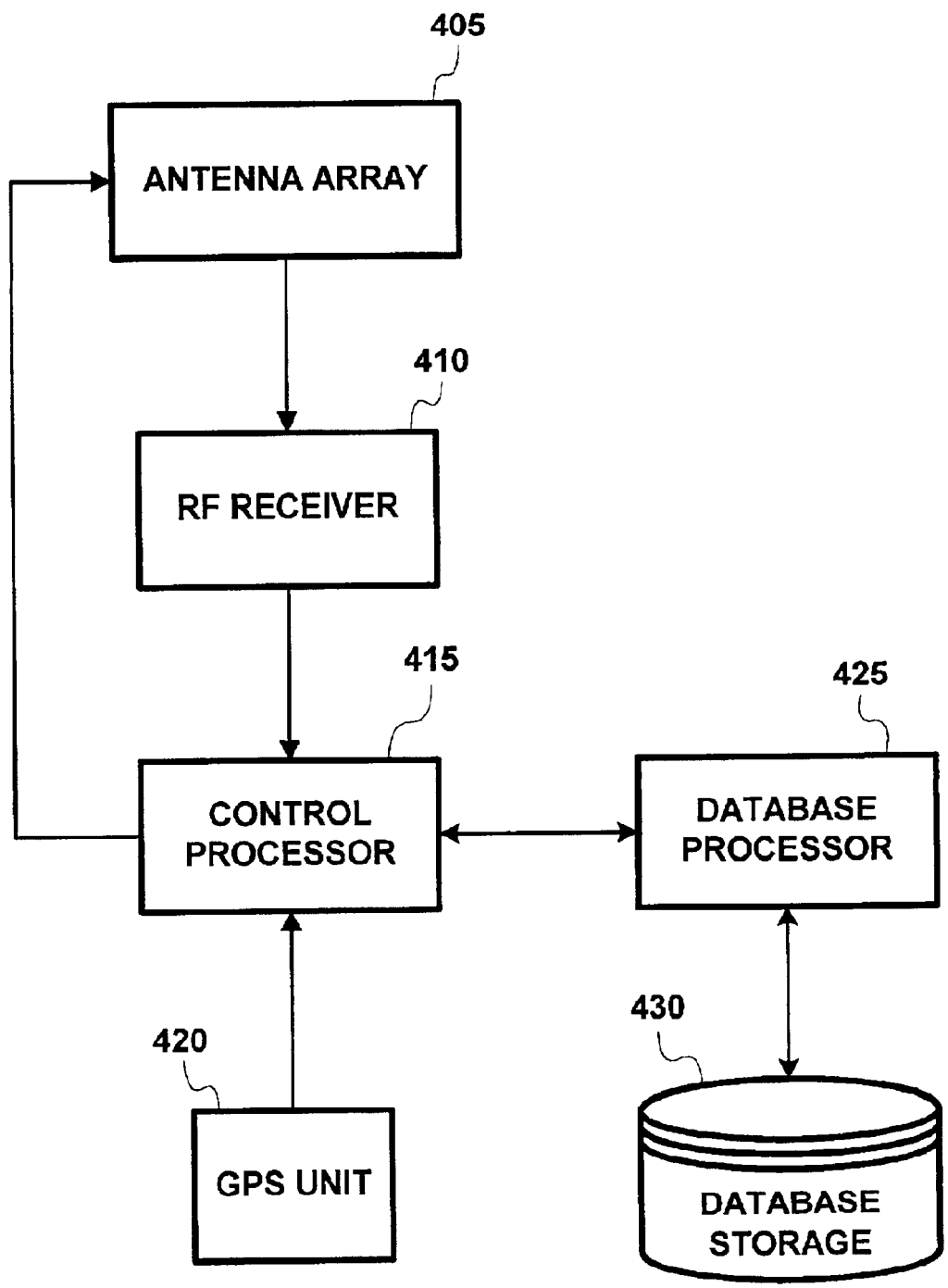
FIG. 4 illustrates a block diagram of an apparatus according to an embodiment of the present invention.

Referring to FIG. 4, a block diagram of an apparatus according to an embodiment of the present invention is illustrated. An RF receiver 410 produces a composite signal received via an antenna array 405 with at least one steerable null. The steerable null feature is controlled by the control processor 415, and is used to, when feasible, nullify the dominant received component so that the other received components may be accurately quantified.

Antennas with steerable nulls have been developed, primarily for the purpose of counteracting jamming signals. In general, these adaptive antenna control systems respond to a jamming signal (which are basically a malicious form of co-channel interference) by forming a null in the antenna pattern, greatly reducing the gain in the direction in which the jamming signal appears. In the context of the present invention, this anti-jamming technology is useful, not for counteracting intentional jamming, but for suppressing a dominant signal that is simply not of interest for the problem of quantifying co-channel interference sources.

A number of mathematical techniques known as nulling algorithms have been used to produce effective nulls. These nulling algorithms each have advantages and disadvantages depending on the nulling criteria. For example, most nulling algorithms perform both a suppression function to null one or more particular strong signals and a pattern constraint function to maintain the antenna pattern or coverage area for continued communication in the antenna coverage area.

One such system is disclosed in U.S. Pat. No. 5,175,558 to DuPree, which is hereby incorporated by reference. In DuPree, the nulling algorithm performs suppression of a strong undesired signal using a gradient approach and pattern constraint using a difference in weights approach. Another antenna nulling algorithm is provided by MIT Lincoln Labs which is known as the PACE algorithm (Post Adaptive Coverage Enhancement) or the S-PACE algorithm (Superior Post Adaptive Coverage Enhancement). Each of these antenna nulling algorithms again provide for both suppression of a strong undesired signal and pattern constraint. The signal suppression is provided using a null space approach, also known as Eigen-vector nulling. U.S. Pat. No. 6,130,643 to Trippett et al. provides an antenna nulling system that produces sharp nulls in the directions from which strong undesired signals arrive but does not degrade desired incoming communications signals from multiple desired stations.

The control processor 415 receives RF data from the RF receiver 410 and coordinate data from the GPS receiver 420. The data to be recorded for each component at each measurement point is directed from the control processor 415 to the database processor 425 and stored in a data storage device 430. Alternatively, the invention is embodied so that the functions of the control processor 415 and the database processor 425 are merged into a single processor.

Referring again to FIG. 1, one or more of the known methods of decoding the color code of each identified component is used 145 at the measurement point where the results of the power analysis of each component indicate that such detection has a good chance of succeeding 140. In this way, the wasteful in terms of processing time and the low rate of success use of complex joint detection algorithms is minimized, and their chances of success maximized. The use of an antenna array 405 having one or more steerable nulls for the suppression of the dominant signals is also part of the method covered by this patent. The lack of the requirement to detect color codes at every measurement point helps solve the difficulty arising when the directions to the dominating unwanted component and to the component to be detected are too close to be resolved by the phase array. According to the present invention, the device waits until the changing position of the test vehicle makes the suppression of the stronger signal (or signals) possible.

When a color-code detection has been successfully carried out in the described manner 150, all the instances of the given component in the device's data base, corresponding to the measurement points during the life time of the component, are back-annotated 155 by the newly-found color code. Thusly, the task of determining the color code at each measurement point along the vehicle's route has been solved with a single successful detection (at one of the measurement points). The circumstance that allowed this saving of processing time and increase of the probability of complete coverage, was the substitution of the color code, as the means of tracking a component, by a more robust indicator—the time-of-arrival of a known TDMA signal burst, the processing gain of the correlation method of detecting the burst being high.

The described herein method and apparatus according to the present invention ensures the completeness and lack of ambiguity of the co-channel interference measurements and identification during a drive test. It provides information on multiple interference components 160 and geographical positions of their sources, in addition to what is customarily provided by the drive-test measurement systems known in the art.

The present invention has been described in terms of preferred embodiments, however, it will be appreciated that various modifications and improvements may be made to the described embodiments without departing from the scope of the invention.

What is claimed is:

1. A method of measuring co-channel interference in a wireless network, the method comprising:

receiving a composite signal including signals from plural base stations of the wireless network;

correlating the received composite signal with an a prior known burst waveform;

registering all correlation peaks found as a result of correlating as distinct components in a result database;

determining, for each component, if it is a new instance of a component already acquired during previous measurements, or if it is a new component;

in the event that a component is determined to be a new instance of a component already acquired during previous measurements, assigning to that component an old identifier consistent with previous instances of the same component;

in the event that a component is determined to be a new component, assigning to that component a new identifier;

determining, for each component, its relative power by the height of its respective correlation peak;

log relative power data into the result database for all of the components;

determining, for each component, its time-of-arrival relative to a time-base reference; and log time-of-arrival data into the result database for all of the components.

2. The method of measuring co-channel interference in a wireless network of claim 1, further comprising:

estimating the chance of success of decoding color code for each component;

attempting to decode color code of any components for which the estimated chance of success exceeds a predetermined threshold value; and annotating the result database to include color code data for any components for which an attempted decode of color code was successful.

3. The method of measuring co-channel interference in a wireless network of claim 1, wherein the determination, for each component, if it is a new instance of a component already acquired during previous measurements, or if it is a new component comprises:

comparing time-of-arrival data for the subject component with time-of-arrival data for one of the previous measurements to create a time-of-arrival difference;

in the event that the time-of-arrival difference is below a predetermined threshold value, then the component is determined to be a new instance of a component already acquired during previous measurements; and in the event that the time-of-arrival difference is not below a predetermined threshold value, then the component is determined to be a new component.

4. An apparatus for making co-channel interference measurements, the apparatus comprising:
  an antenna;
  an RF receiver connected to the antenna to receive a composite signal, the RF receiver producing RF data;
  a GPS receiver generating coordinate data;
  a processor connected to receive the RF data from the RF receiver and the coordinate data from the GPS receiver;
  a database storage device connected to the processor; and
  a processor memory in addressable communication with the processor, the processor memory bearing software instructions adapted to enable the apparatus to perform the steps of:
    nulling a dominant received component from the RF data so as to enable other received components of the composite signal passed through as the RF data to be quantified as co-channel data by the processor correlating the received composite signal with an a prior known burst waveform;
    registering all correlation peaks found as a result of correlating as distinct components in the database storage device;
    determining, for each component, if it is a new instance of a component already acquired during previous measurements, or if it is a new component;
    in the event that a component is determined to be a new instance of a component already acquired during previous measurements, assigning to that component an old identifier consistent with previous instances of the same component;
    in the event that a component is determined to be a new component, assigning to that component a new identifier;
    determining, for each component, its relative power by the height of its respective correlation peak;
    log relative power data into the database storage device for all of the components;
    determining, for each component, its time-of-arrival relative to a time-base reference; and
    log time-of-arrival data into the database storage device for all of the components.

5. The apparatus for making co-channel interference measurements of claim 4, wherein the processor memory bears software instructions adapted to enable the apparatus to perform the further steps of:
  estimating the chance of success of decoding color code for each component:
  attempting to decode color code of any components for which the estimated chance of success exceeds a predetermined threshold value, and
  annotating the database storage device to include color code data for any components for which an attempted decode of color code was successful.

6. The apparatus for making co-channel interference measurements of claim 4, wherein the processor memory bears software instructions adapted to enable the apparatus to perform the step of determining, for each component, its relative power by the height of its respective correlation peak by the steps of:
  comparing time-of-arrival data for the subject component with time-of-arrival data for one of the previous measurements to create a time-of-arrival difference;
  in the event that the time-of-arrival difference is below a predetermined threshold value, then the component is determined to be a new instance of a component already acquired during previous measurements; and
  in the event that the time-of-arrival difference is not below a predetermined threshold value, then the component is determined to be a new component.

7. An apparatus for making co-channel interference measurements, the apparatus comprising:
  an antenna array having a steerable null;
  an RF receiver connected to the antenna array to receive a composite signal, the RF receiver producing RF data;
  a GPS receiver generating coordinate data;
  a processor connected to receive the RF data from the RF receiver and the coordinate data from the GPS receiver; and
  a database storage device connected to the processor;
  wherein the processor is further connected to the antenna array and generates control signals to control the steerable null so as to nullify a dominant received component from the composite signal so as to enable other received components of the composite signal passed through as the RF data to be quantified as co-channel data by the processor;
  wherein the processor records the quantified co-channel data and the coordinate data in the database storage device; and
  wherein the apparatus further comprises:
  a processor memory in addressable communication with the processor, the processor memory bearing software instructions adapted to enable the apparatus to perform the steps of:
    correlating the received composite signal with an a prior known burst waveform;
    registering all correlation peaks found as a result of correlating as distinct components in the database storage device;
    determining, for each component, if it is a new instance of a component already acquired during previous measurements, or if it is a new component;
    in the event that a component is determined to be a new instance of a component already acquired during previous measurements, assigning to that component an old identifier consistent with previous instances of the same component;
    in the event that a component is determined to be a new component, assigning to that component a new identifier;
    determining, for each component, its relative power by the height of its respective correlation peak;
    log relative power data into the database storage device for all of the components;
    determining, for each component, its time-of-arrival relative to a time-base reference; and
    log time-of-arrival data into the database storage device for all of the components.

8. The apparatus for making co-channel interference measurements of claim 7, wherein the processor memory bears software instructions adapted to enable the apparatus to perform the further steps of:
  estimating the chance of success of decoding color code for each component;
  attempting to decode color code of any components for which the estimated chance of success exceeds a predetermined threshold value; and
  annotating the database storage device to include color code data for any components for which an attempted decode of color code was successful.

9. The apparatus for making co-channel interference measurements of claim 7, wherein the processor memory bears software instructions adapted to enable the apparatus to perform the step of determining, for each component, its relative power by the height of its respective correlation peak by the steps of:

comparing time-of-arrival data for the subject component with time-of-arrival data for one of the previous measurements to create a time-of-arrival difference;

in the event that the time-of-arrival difference is below a predetermined threshold value, then the component is determined to be a new instance of a component already acquired during previous measurements; and in the event that the time-of-arrival difference is not below a predetermined threshold value, then the component is determined to be a new component.

* * * * *

UNITED STATES PATENT AND TRADEMARK OFFICE
CERTIFICATE OF CORRECTION

PATENT NO. : 6,931,235 B2
APPLICATION NO. : 09/795225
DATED : August 16, 2005
INVENTOR(S) : Paul A. Kline It is certified that error appears in the above-identified patent and that said Letters Patent is hereby corrected as shown below:

Title Page

(73)   Assignee

"Dynamic Telecommunications, Inc."

should read --PCTel Maryland, Inc."

Signed and Sealed this

Twenty-eighth Day of August, 2007

JON W. DUDAS
*Director of the United States Patent and Trademark Office*